US012634982B2

(12) United States Patent
Ma et al.

(10) Patent No.: US 12,634,982 B2
(45) Date of Patent: May 19, 2026

(54) RANDOM ACCESS CHANNEL OCCASION SELECTION BASED ON USER EQUIPMENT TRANSMISSION CAPABILITIES

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Peter Gaal, San Diego, CA (US); Juan Montojo, San Diego, CA (US); Jun Ma, San Diego, CA (US); Bharat Shrestha, San Diego, CA (US); Umesh Phuyal, San Diego, CA (US); Yiqing Cao, Beijing (CN); Huilin Xu, Temecula, CA (US); Wanshi Chen, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/262,617

(22) PCT Filed: Mar. 22, 2021

(86) PCT No.: PCT/CN2021/082007
§ 371 (c)(1),
(2) Date: Jul. 24, 2023

(87) PCT Pub. No.: WO2022/198364
PCT Pub. Date: Sep. 29, 2022

(65) Prior Publication Data
US 2024/0080884 A1     Mar. 7, 2024

(51) Int. Cl.
*H04W 74/00*     (2009.01)
*H04W 52/36*     (2009.01)

(52) U.S. Cl.
CPC ....... *H04W 74/006* (2013.01); *H04W 52/367* (2013.01)

(58) Field of Classification Search
CPC ............. H04W 74/006; H04W 52/367; H04W 74/0833; H04W 74/002; H04B 7/18513
See application file for complete search history.

(56) References Cited

U.S. PATENT DOCUMENTS

| | | | |
|---|---|---|---|
| 2021/0051672 A1 | 2/2021 | Rastegardoost et al. | |
| 2021/0051733 A1 | 2/2021 | Lee et al. | |

(Continued)

FOREIGN PATENT DOCUMENTS

| | | |
|---|---|---|
| CN | 109560839 A | 4/2019 |
| CN | 112369104 A | 2/2021 |

(Continued)

OTHER PUBLICATIONS

Supplementary European Search Report—EP21931999—Search Authority—The Hague—Nov. 27, 2024.

(Continued)

*Primary Examiner* — Abdullahi Ahmed
(74) *Attorney, Agent, or Firm* — Harrity & Harrity, LLP

(57)     ABSTRACT

Various aspects of the present disclosure generally relate to wireless communication. In some aspects, a network node may transmit, and a user equipment (UE) may receive, signaling that indicates at least a first random access channel (RACH) occasion (RO) partition and a second RO partition. The first RO partition may be associated with different uplink transmission capabilities than the second RO partition. The UE may select an RO in the first RO partition or the second RO partition based at least in part on a metric that (Continued)

relates to an uplink transmission capability of the UE. The UE may transmit, and the network node may receive, a preamble in the selected RO to initiate a RACH procedure. Numerous other aspects are described.

31 Claims, 12 Drawing Sheets

(56)　　　　　　　References Cited

U.S. PATENT DOCUMENTS

| | | | |
|---|---|---|---|
| 2022/0210844 A1* | 6/2022 | MolavianJazi | H04L 5/0053 |
| 2022/0287103 A1* | 9/2022 | Cozzo | H04W 74/0833 |
| 2024/0032107 A1* | 1/2024 | Cozzo | H04W 74/0891 |
| 2024/0120976 A1* | 4/2024 | Ma | H04B 7/061 |

FOREIGN PATENT DOCUMENTS

| | | |
|---|---|---|
| WO | 2021034084 A1 | 2/2021 |
| WO | 2022186614 A1 | 9/2022 |

OTHER PUBLICATIONS

Asustek, "Discussion on RO Configuration Between SDT and Legacy RA", 3GPP TSG-RAN WG2 Meeting #113 Electronic, R2-2101751, Feb. 5, 2021 (Feb. 5, 2021), 2 Pages, Sections 1-2.
International Search Report and Written Opinion—PCT/CN2021/082007—ISA/EPO—Nov. 25, 2021.

* cited by examiner

Figure 6B:
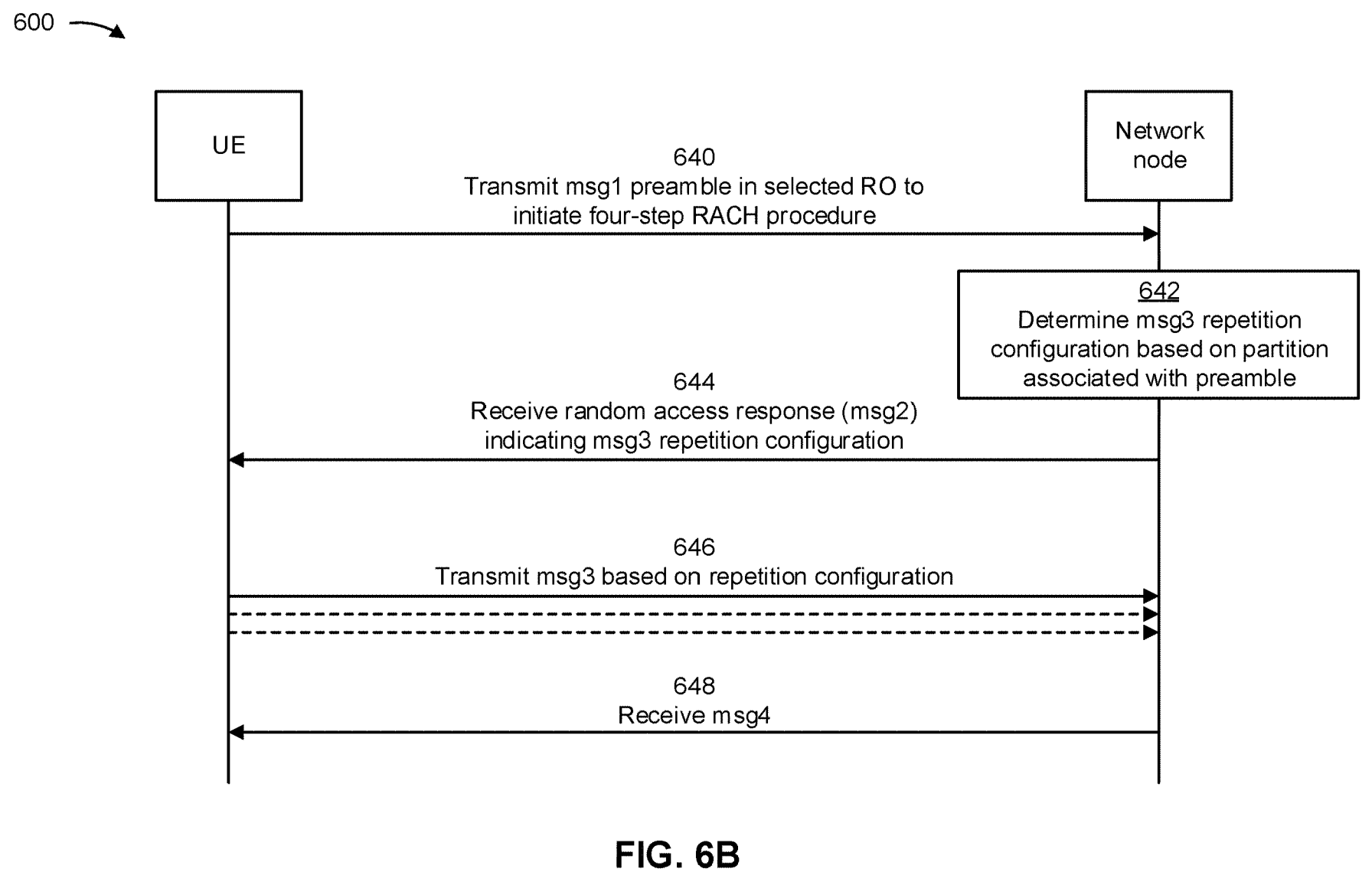

Network
node

<u>642</u>
Determine msg3 repetition
configuration based on partition
associated with preamble 640
Transmit msg1 preamble in selected RO to
initiate four-step RACH procedure 644
Receive random access response (msg2)
indicating msg3 repetition configuration 646
Transmit msg3 based on repetition configuration 648
Receive msg4

650
Transmit msgA preamble in selected RO to
initiate two-step RACH procedure

652
Transmit msgA payload in PUSCH occasion associated
with selected RO using corresponding resource allocation 654
Receive msgB

600

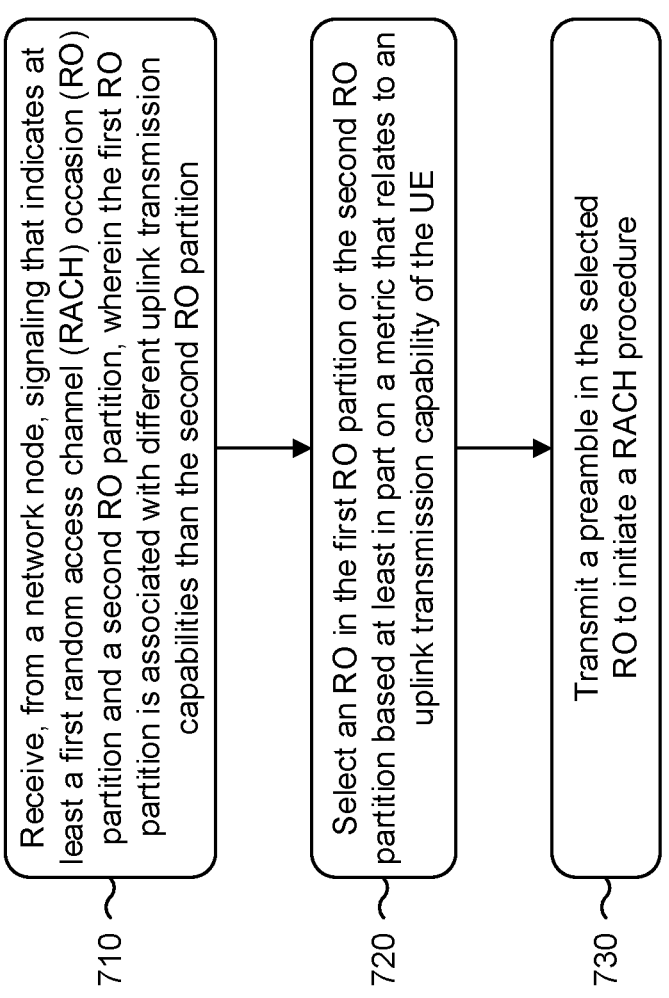

710 Receive, from a network node, signaling that indicates at least a first random access channel (RACH) occasion (RO) partition and a second RO partition, wherein the first RO partition is associated with different uplink transmission capabilities than the second RO partition 720 Select an RO in the first RO partition or the second RO partition based at least in part on a metric that relates to an uplink transmission capability of the UE 730 Transmit a preamble in the selected RO to initiate a RACH procedure

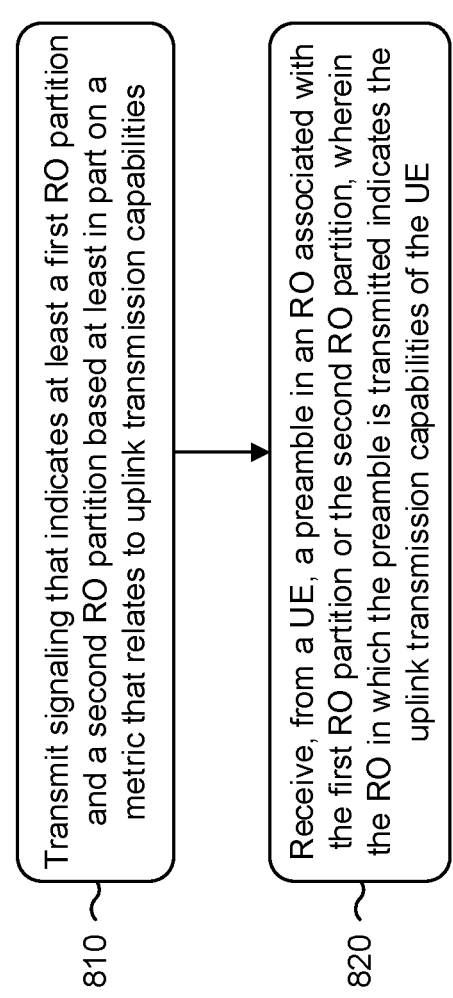

Transmit signaling that indicates at least a first RO partition and a second RO partition based at least in part on a metric that relates to uplink transmission capabilities

810

Receive, from a UE, a preamble in an RO associated with the first RO partition or the second RO partition, wherein the RO in which the preamble is transmitted indicates the uplink transmission capabilities of the UE

RANDOM ACCESS CHANNEL OCCASION SELECTION BASED ON USER EQUIPMENT TRANSMISSION CAPABILITIES

CROSS-REFERENCE TO RELATED APPLICATION

This application is a 371 national stage of Patent Cooperation Treaty (PCT) Application No. PCT/CN2021/082007 filed on Mar. 22, 2021, entitled "RANDOM ACCESS CHANNEL OCCASION SELECTION BASED ON USER EQUIPMENT TRANSMISSION CAPABILITIES," which is hereby expressly incorporated by reference herein.

FIELD OF THE DISCLOSURE

Aspects of the present disclosure generally relate to wireless communication and to techniques and apparatuses for random access channel occasion selection based on user equipment transmission capabilities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a network node, signaling that indicates at least a first random access channel (RACH) occasion (RO) partition and a second RO partition, wherein the first RO partition is associated with different uplink transmission capabilities than the second RO partition; select an RO in the first RO partition or the second RO partition based at least in part on a metric that relates to an uplink transmission capability of the UE; and transmit a preamble in the selected RO to initiate a RACH procedure.

In some aspects, a network node for wireless communication includes a memory and one or more processors, coupled to the memory, configured to: transmit signaling that indicates at least a first RO partition and a second RO partition based at least in part on a metric that relates to uplink transmission capabilities; and receive, from a UE, a preamble in an RO associated with the first RO partition or the second RO partition, wherein the RO in which the preamble is transmitted indicates the uplink transmission capabilities of the UE.

In some aspects, a method of wireless communication performed by a UE includes receiving, from a network node, signaling that indicates at least a first RO partition and a second RO partition, wherein the first RO partition is associated with different uplink transmission capabilities than the second RO partition; selecting an RO in the first RO partition or the second RO partition based at least in part on a metric that relates to an uplink transmission capability of the UE; and transmitting a preamble in the selected RO to initiate a RACH procedure.

In some aspects, a method of wireless communication performed by a network node includes transmitting signaling that indicates at least a first RO partition and a second RO partition based at least in part on a metric that relates to uplink transmission capabilities; and receiving, from a UE, a preamble in an RO associated with the first RO partition or the second RO partition, wherein the RO in which the preamble is transmitted indicates the uplink transmission capabilities of the UE.

In some aspects, an apparatus for wireless communication includes means for receiving, from a network node, signaling that indicates at least a first RO partition and a second RO partition, wherein the first RO partition is associated with different uplink transmission capabilities than the second RO partition; means for selecting an RO in the first RO partition or the second RO partition based at least in part on a metric that relates to an uplink transmission capability of the UE; and means for transmitting a preamble in the selected RO to initiate a RACH procedure.

In some aspects, an apparatus for wireless communication includes means for transmitting signaling that indicates at least a first RO partition and a second RO partition based at least in part on a metric that relates to uplink transmission capabilities; and means for receiving, from a UE, a preamble in an RO associated with the first RO partition or the second RO partition, wherein the RO in which the preamble is transmitted indicates the uplink transmission capabilities of the UE.

In some aspects, a non-transitory computer-readable medium storing a set of instructions for wireless communication includes one or more instructions that, when executed by one or more processors of a UE, cause the UE to: receive, from a network node, signaling that indicates at least a first RO partition and a second RO partition, wherein the first RO partition is associated with different uplink transmission capabilities than the second RO partition; select an RO in the first RO partition or the second RO partition based at least in part on a metric that relates to an uplink transmission capability of the UE; and transmit a preamble in the selected RO to initiate a RACH procedure.

In some aspects, a non-transitory computer-readable medium storing a set of instructions for wireless communication includes one or more instructions that, when executed by one or more processors of a network node, cause the network node to: transmit signaling that indicates at least a first RO partition and a second RO partition based at least in part on a metric that relates to uplink transmission capabilities; and receive, from a UE, a preamble in an RO associated with the first RO partition or the second RO partition, wherein the RO in which the preamble is transmitted indicates the uplink transmission capabilities of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6C are diagrams illustrating examples associated with RACH occasion (RO) selection based on UE transmission capabilities, in accordance with the present disclosure.

FIGS. 7-8 are diagrams illustrating example processes associated with RO selection based on UE transmission capabilities, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
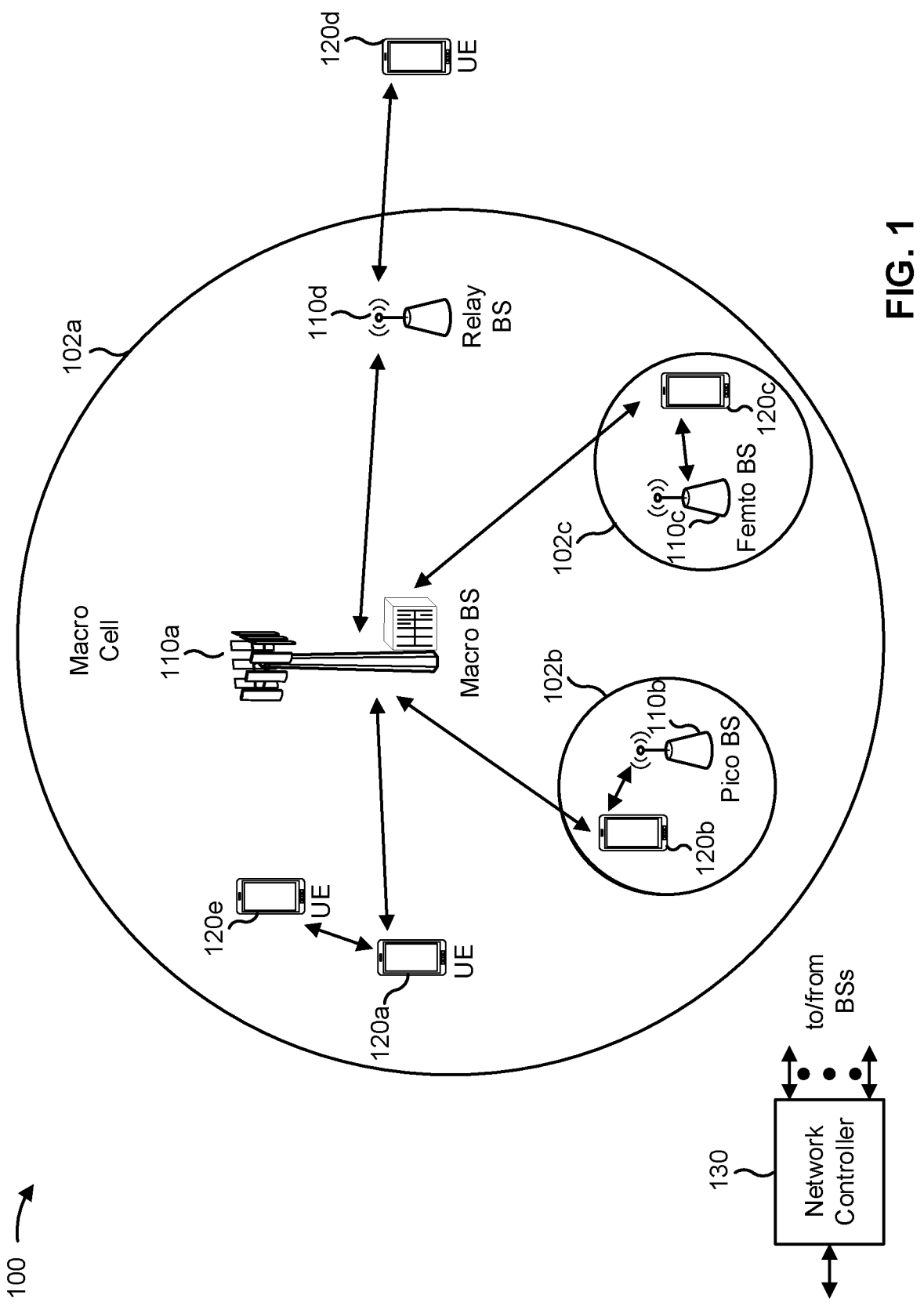
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each ULE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) proto-col or a vehicle-to-infrastructure (V2I) protocol), and/or a mesh network. In this case, the UE 120 may perform scheduling operations, resource selection operations, and/or other operations described elsewhere herein as being per-formed by the base station 110.

Devices of wireless network 100 may communicate using the electromagnetic spectrum, which may be subdivided based on frequency or wavelength into various classes, bands, channels, or the like. For example, devices of wire-less network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The fre-quencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high fre-quency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Simi-larly, unless specifically stated otherwise, it should be under-stood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
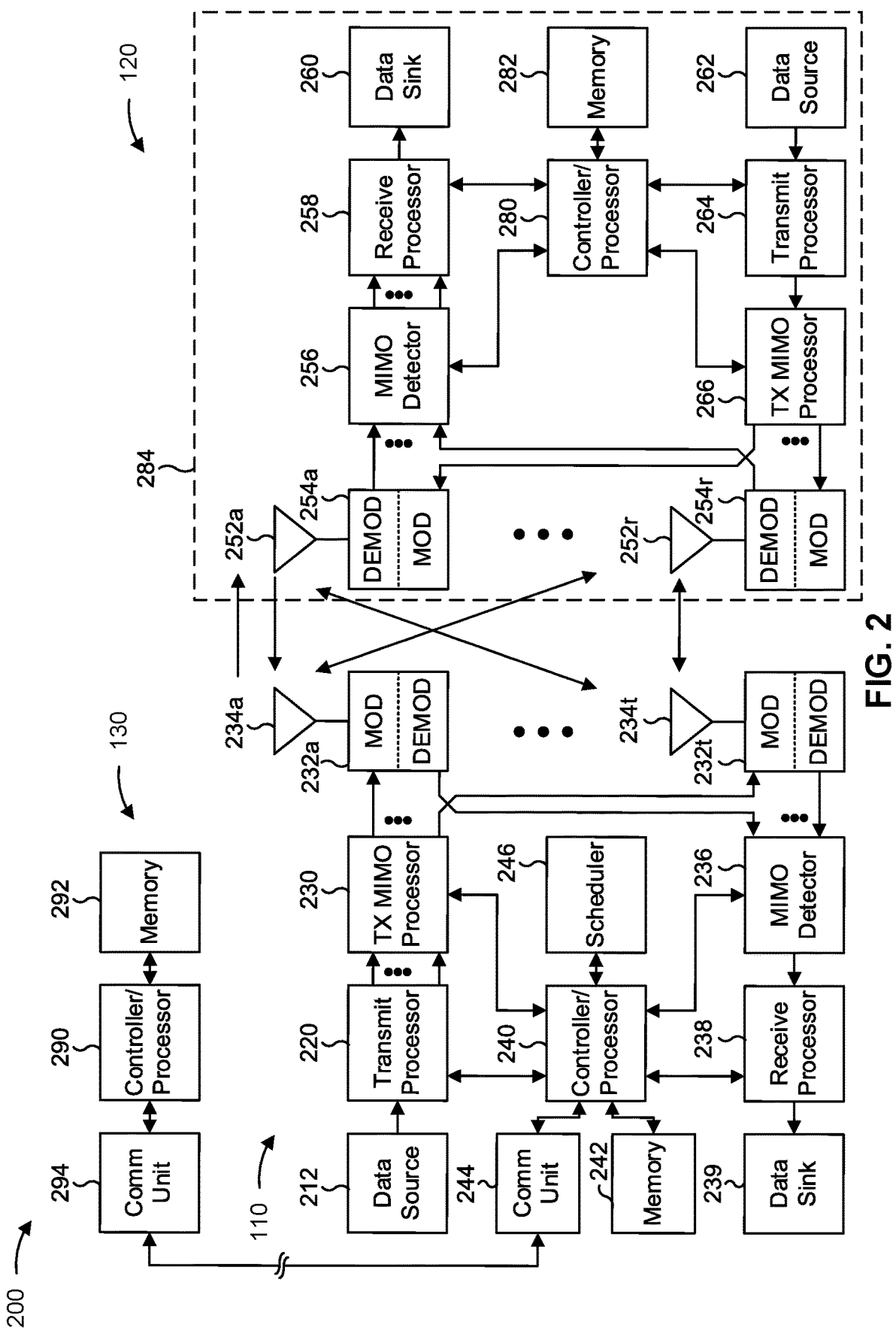
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system informa-tion (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary syn-chronization signal (SSS)). A transmit (TX) multiple-input multiple-output (MIMO) processor 230 may perform spatial processing (e.g., precoding) on the data symbols, the control symbols, the overhead symbols, and/or the reference sym-bols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodu-lator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more proces-sors, or a combination thereof. A channel processor may determine a reference signal received power (RSRP) param-eter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or anten-nas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or recep-tion components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 6A-6C, FIG. 7, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 6A-6C, FIG. 7, and/or FIG. 8).

Controller/processor 240 of base station 110, controller/processor 280 of UE 120, and/or any other component(s) of FIG. 2 may perform one or more techniques associated with random access channel (RACH) occasion (RO) selection based on UE transmission capabilities, as described in more detail elsewhere herein. In some aspects, a network node as described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving, from a network node, signaling that indicates at least a first RO partition and a second RO partition, wherein the first RO partition is associated with different uplink transmission capabilities than the second RO partition; means for selecting an RO in the first RO partition or the second RO partition based at least in part on a metric that relates to an uplink transmission capability of the UE; and/or means for transmitting a preamble in the selected RO to initiate a RACH procedure. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for selecting, within the RO and based at least in part on the metric that relates to the uplink transmission capability of the UE, the preamble to be transmitted in the RO from a first set of physical RACH (PRACH) preambles or a second set of PRACH preambles, wherein the first set of PRACH preambles and the second set of PRACH preambles are associated with different uplink transmission capabilities.

In some aspects, the UE 120 includes means for selecting, based at least in part on the metric that relates to the uplink transmission capability of the UE, the preamble to be transmitted in the RO from a first set of RO and PRACH preamble combinations or a second set of RO and PRACH preamble combinations, wherein the first set of RO and PRACH preamble combinations and the second set of RO and PRACH preamble combinations are associated with different uplink transmission capabilities.

In some aspects, the UE 120 includes means for receiving a msg2 communication that indicates a repetition configuration for the msg3 communication based at least in part on the RO in which the preamble is transmitted.

In some aspects, the UE 120 includes means for generating a msgA payload based at least in part on the resource allocation for a physical uplink shared channel (PUSCH) occasion associated with the RO; and/or means for transmitting the msgA payload in the PUSCH occasion associated with the RO.

In some aspects, the network node includes means for transmitting signaling that indicates at least a first RO partition and a second RO partition based at least in part on a metric that relates to uplink transmission capabilities; and/or means for receiving, from a UE 120, a preamble in an RO associated with the first RO partition or the second RO partition, wherein the RO in which the preamble is transmitted indicates the uplink transmission capabilities of the UE. In some aspects, the means for the network node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the network node includes means for determining whether the UE needs the first number of repetitions for the msg3 communication or the second number of repetitions for the msg3 communication based at least in part on the RO in which the preamble is transmitted.

In some aspects, the network node includes means for transmitting, to the UE, a msg2 communication that indicates a repetition configuration for the msg3 communication based at least in part on the RO in which the preamble is transmitted.

In some aspects, the network node includes means for receiving a msgA payload in a PUSCH occasion associated with the RO.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
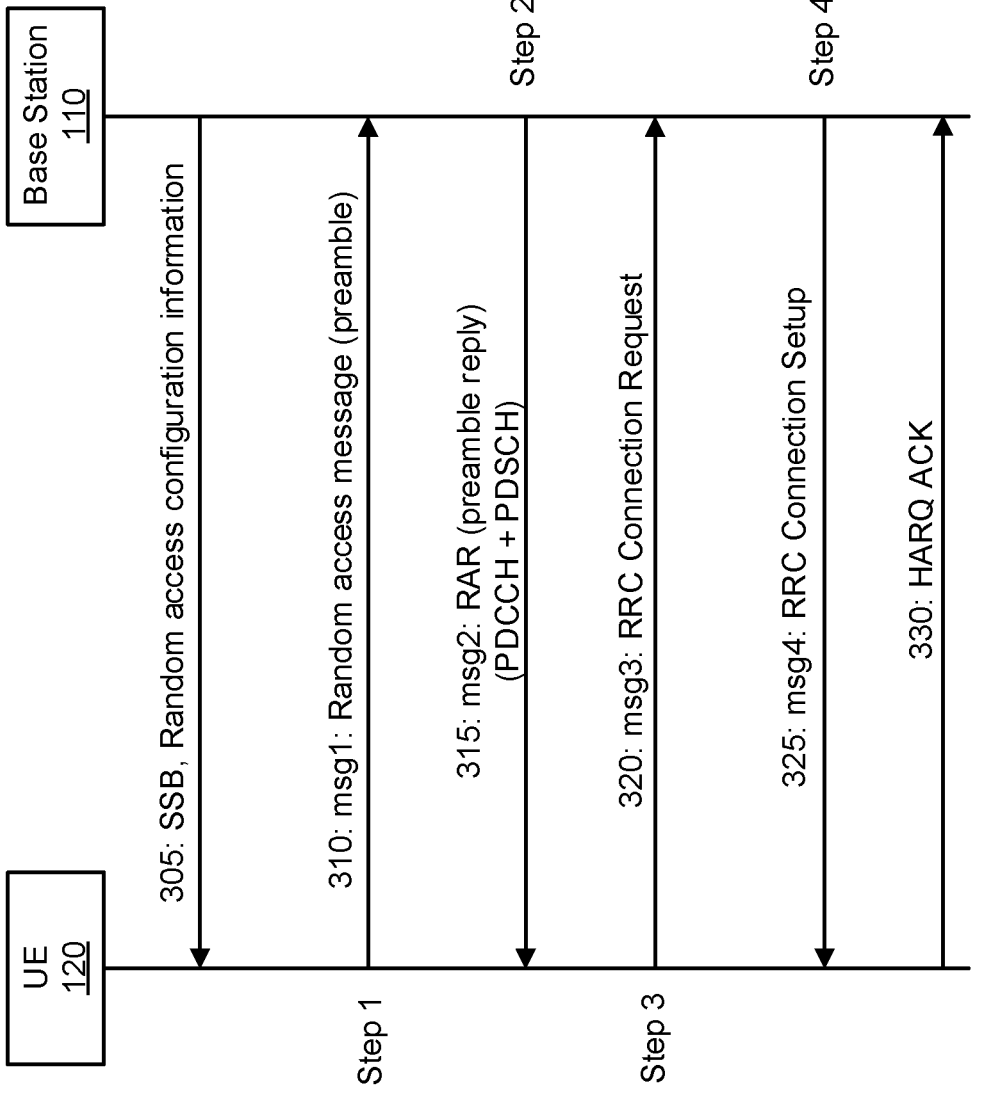
FIG. 3 is a diagram illustrating an example of a four-step random access channel (RACH) procedure, in accordance with the present disclosure.

FIG. 3 is a diagram illustrating an example of a four-step RACH procedure, in accordance with the present disclosure. As shown in FIG. 3, a base station 110 and a UE 120 may communicate with one another to perform the four-step RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the four-step RACH procedure, such as one or more parameters for transmitting a random access message (RAM) and/or one or more parameters for receiving a random access response (RAR) as a reply to the RAM. For example, the random access configuration information may indicate one or more ROs that include time and frequency resources in which the UE 120 may transmit a RAM to initiate the four-step RACH procedure.

As shown by reference number 310, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step RACH procedure. The RAM may include a random access preamble identifier.

As shown by reference number 315, the base station 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step RACH procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit an RRC connection request message. The RRC connection request message may be referred to as message 3, msg3, MSG3, or a third message of a four-step RACH procedure. In some aspects, the RRC connection request may include a UE identifier, uplink control information (UCI), and/or a PUSCH communication (e.g., an RRC connection request).

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 330, if the UE 120 successfully receives the RRC connection setup message, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
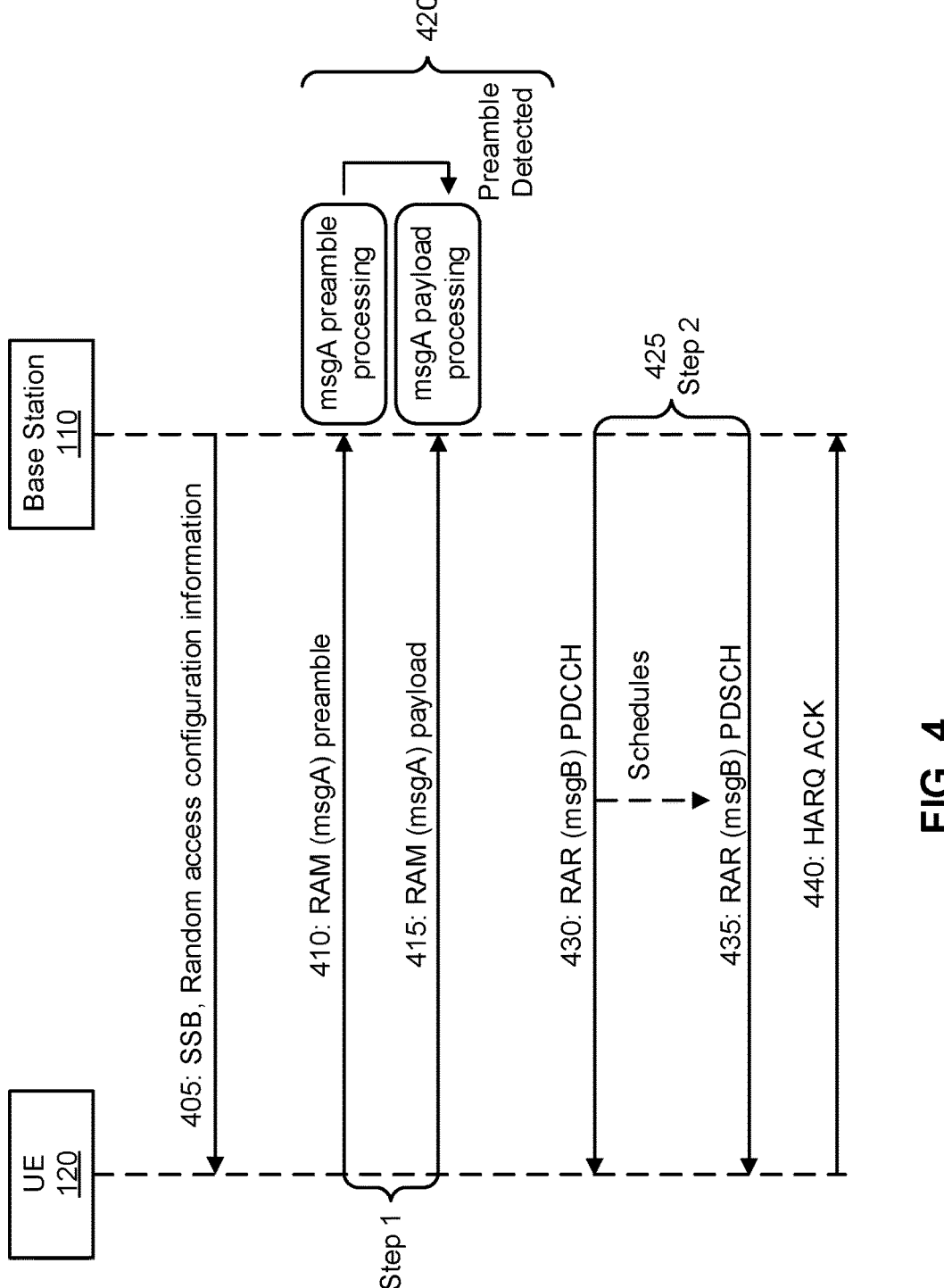
FIG. 4 is a diagram illustrating an example of a two-step RACH procedure, in accordance with the present disclosure.

FIG. 4 is a diagram illustrating an example 400 of a two-step RACH procedure, in accordance with the present disclosure. As shown in FIG. 4, a base station 110 and a UE 120 may communicate with one another to perform the two-step RACH procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers the two-step RACH procedure, such as for contention-free random access. The random access configuration information may include one or more parameters to be used in the two-step RACH procedure, such as one or more parameters for transmitting a RAM and/or receiving an RAR as a reply to the RAM. For example, the random access configuration information may indicate one or more ROs that include time and frequency resources in which the UE 120 may transmit a RAM to initiate the two-step RACH procedure.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step RACH procedure. In some aspects, the RAM may be referred to as message A, msgA, a first message, or an initial message in a two-step RACH procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of message 1 (msg1) and message 3 (msg3) of the four-step RACH procedure described in more detail above. For example, the RAM preamble may include some or all contents of message 1 (e.g., a PRACH preamble), and the RAM payload may include some or all contents of message 3 (e.g., a UE identifier, UCI, and/or a PUSCH transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step RACH procedure. In some aspects, the RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 435, as part of the second step of the two-step RACH procedure, the base station 110 may transmit the PDSCH communication for the RAR, as scheduled by the PDCCH communication. The RAR may be included in a MAC PDU of the PDSCH communication. As shown by reference number 440, if the UE 120 successfully receives the RAR, the UE 120 may transmit a HARQ ACK.

As indicated above, FIG. 4 is provided as an example. Other examples may differ from what is described with regard to FIG. 4.

Figure 5:
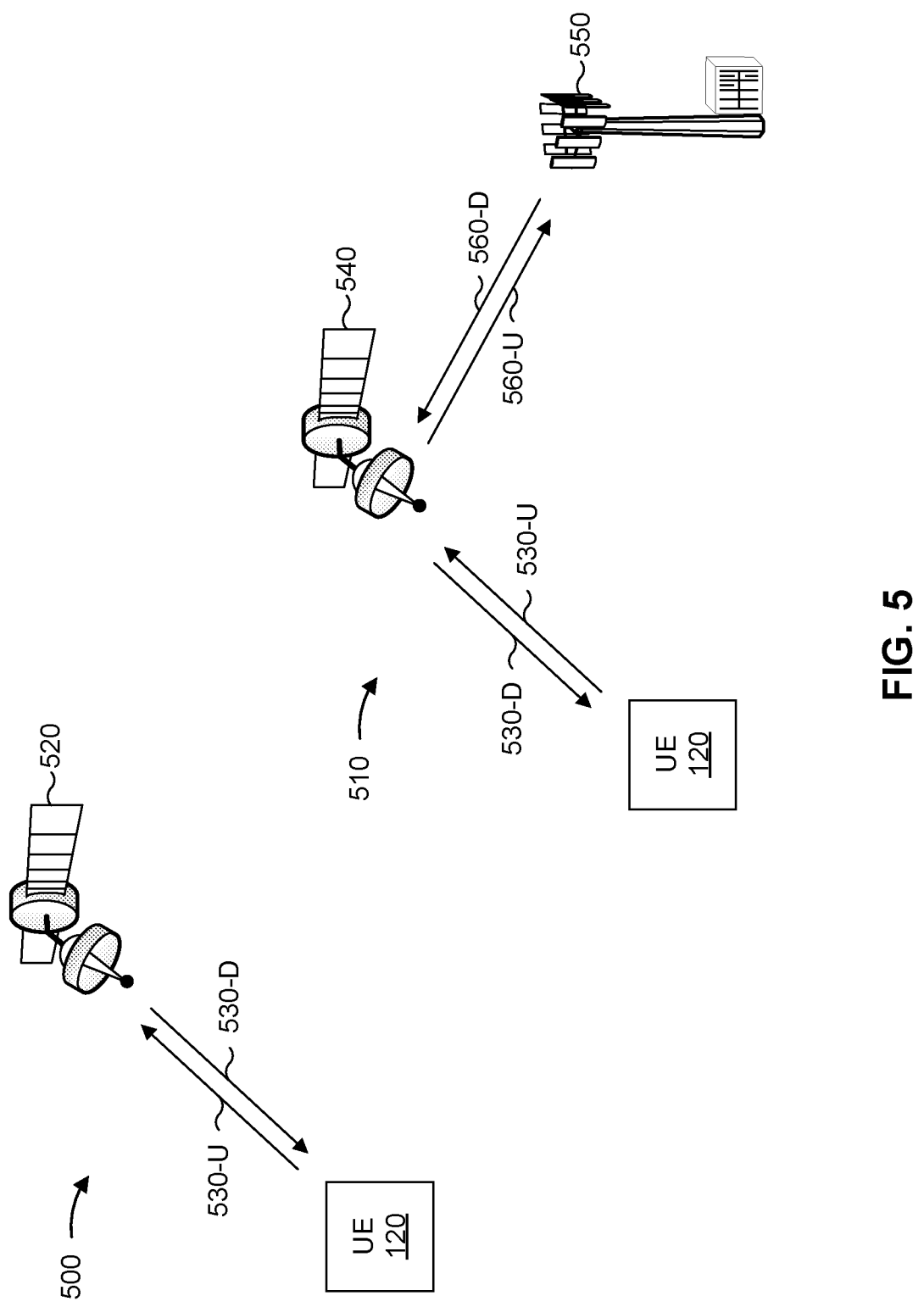
FIG. 5 is a diagram illustrating an example of a regenerative satellite deployment and an example of a transparent satellite deployment in a non-terrestrial network, in accordance with the present disclosure.

FIG. 5 is a diagram illustrating an example 500 of a regenerative satellite deployment and an example 510 of a transparent satellite deployment in a non-terrestrial network (NTN), in accordance with the present disclosure.

Example 500 shows a regenerative satellite deployment. In example 500, a UE 120 is served by a satellite 520 via a service link 530. For example, the satellite 520 may include a BS 110 (e.g., BS 110*a*) or a gNB. In some aspects, the satellite 520 may be referred to as a non-terrestrial base station, a regenerative repeater, and/or an on-board processing repeater, among other examples. In some aspects, the satellite 520 may demodulate an uplink radio frequency signal, and may modulate a baseband signal derived from the uplink radio signal to produce a downlink radio frequency transmission. The satellite 520 may transmit the downlink radio frequency signal on the service link 530. The satellite 520 may provide a cell that covers the UE 120.

Example 510 shows a transparent satellite deployment, which may also be referred to as a bent-pipe satellite deployment. In example 510, a UE 120 is served by a satellite 540 via the service link 530. The satellite 540 may be a transparent satellite. The satellite 540 may relay a signal received from a gateway 550 via a feeder link 560. For example, the satellite 540 may receive a radio frequency transmission from the gateway 550 via the feeder link 560, and may relay the radio frequency transmission to the UE 120 via the service link 530 without demodulating the radio frequency transmission. Additionally, or alternatively, the satellite 540 may receive a radio frequency transmission from the UE 120 via the service link 530, and may relay the radio frequency transmission to the gateway 550 via the feeder link 560 without demodulating the radio frequency transmission. In some aspects, the satellite 540 may frequency convert radio frequency transmissions received on the service link 530 to a frequency of the radio frequency transmission on the feeder link 560 (or vice versa), and may amplify and/or filter the relayed radio frequency transmission. In some aspects, the UEs 120 shown in example 500 and example 510 may be associated with a Global Navigation Satellite System (GNSS) capability or a Global Positioning System (GPS) capability, though not all UEs have such capabilities. The satellite 540 may provide a cell that covers the UE 120.

As shown in FIG. 5, the service link 530 may include a link between the satellite 540 and the UE 120, and may include one or more of an uplink or a downlink. The feeder link 560 may include a link between the satellite 540 and the gateway 550, and may include one or more of an uplink (e.g., from the UE 120 to the gateway 550) or a downlink (e.g., from the gateway 550 to the UE 120). As shown in FIG. 5, an uplink of the service link 530 is indicated by reference number 530-U and a downlink of the service link 530 is indicated by reference number 530-D. Similarly, an uplink of the feeder link 560 is indicated by reference number 560-U and a downlink of the feeder link 560 is indicated by reference number 560-D.

The feeder link 560 and the service link 530 may each experience Doppler effects due to the movement of the satellites 520 and 540, and potentially movement of a UE 120. The Doppler effects may be significantly larger than in a terrestrial network. The Doppler effect on the feeder link 560 may be compensated for to some degree, but may still be associated with some amount of uncompensated frequency error. Furthermore, the gateway 550 may be associated with a residual frequency error, and/or the satellite 520/540 may be associated with an on-board frequency error. These sources of frequency error may cause a received downlink frequency at the UE 120 to drift from a target downlink frequency. Furthermore, due to the long distance between the UE 120 and satellite 520/540, communication in an NTN may be associated with a much longer delay (e.g., longer latency and/or round trip time) than a delay associated with a terrestrial network. The delay may be even greater in a transparent satellite deployment, as any communication between the UE 120 and the gateway 550 must travel over the service link 530 and the feeder link 560, each of which may associated with a longer delay than a terrestrial network. The large propagation delay in an NTN may pose various challenges, including how to configure a RACH procedure to enable initial network access. For example, an uplink message in a RACH procedure (e.g., msg3 in a four-step RACH procedure or msgA in a two-step RACH procedure) may be configured for HARQ-based retransmission, whereby a UE 120 may retransmit the uplink message based at least in part on receiving HARQ feedback that indicates a negative acknowledgement (NACK) for the initial transmission of the uplink message (e.g., based on a base station 110 failing to receive and/or decode the initial transmission).

However, in a wireless network with a large propagation delay (e.g., an NTN and/or an air-to-ground (ATG) communication system), HARQ-based retransmission may be inefficient because a UE 120 has to wait until the NACK is received to indicate that the base station 110 failed to receive and/or decode the initial transmission. Accordingly, in a wireless network with a large propagation delay, a base station 110 may configure one or more uplink messages to be transmitted using multiple repetitions to improve reliability. However, the base station 110 may be configured to communicate with UEs 120 that have different uplink transmission capabilities, which can significantly impact the optimal uplink resource allocation (e.g., the number of repetitions to be configured). For example, in an NTN, a UE 120 transmitting an uplink message to a satellite 520/540 may be a very-small-aperture terminal (VSAT) (e.g., a two-way satellite ground station with a dish antenna with a diameter up to 3.8 meters), which can generally transmit using a maximum transmit power up to five (5) watts, or the UE 120 may be a smartphone in power class 3, which can typically transmit using a maximum transmit power up to 200 milliwatts (mW), among other examples. In another example, in a terrestrial network, a UE 120 transmitting an uplink message may be a smartphone, a fixed wireless access (FWA) that has a higher transmit power capability to provide broadband connections at a residence or office, or a reduced capability (RedCap) UE that has a lower maximum transmit power than a smartphone.

Accordingly, a need to configure repetitions for an uplink message in a RACH procedure may vary among different UEs 120 based on uplink transmission capabilities, which may depend on a maximum uplink transmit power supported by a UE 120 and/or measurements that relate to uplink channel quality, among other examples. However, an ability of a base station 110 to configure the optimal uplink resource allocation (e.g., the optimal number of repetitions, transport block size, and/or MCS, among other examples) is constrained because information related to capabilities of a UE 120 is typically transmitted after the UE 120 has established an RRC connection (e.g., through a successful four-step or two-step RACH procedure). Accordingly, because an RRC connection has not been established at the time that the UE 120 initiates a four-step RACH procedure, the UE 120 may be unable to signal any capability information that may enable the base station 110 to transmit a message (e.g., an RRC message, a MAC-CE, or a DCI message) that indicates an optimal uplink resource allocation (e.g., number of repetitions) for a msg3 transmission. Furthermore, there may be no opportunity for a UE 120 to signal a need for repetitions in a two-step RACH procedure because there is no downlink message that precedes a msgA payload that a UE 120 may need to transmit using repetitions.

Some aspects described herein relate to techniques and apparatuses to configure different RO partitions based on UE transmission capabilities. For example, in some aspects, a network node (e.g., a base station 110, a satellite 520/540, and/or another suitable network device) may configure multiple RO partitions that each include a set of ROs for UEs in a respective category (e.g., a first RO partition for UEs with a high maximum transmit power and a second RO partition for UEs with a low maximum transmit power). In some aspects, a UE may generally be classified into a particular category based at least in part on one or more metrics that relate to uplink transmission capabilities of the UE. For example, the one or more metrics may include a maximum transmit power of the UE, a measurement (e.g., an RSRP measurement) that relates to uplink channel quality for the UE, an accuracy that the UE can achieve for an autonomous timing advance and/or carrier frequency offset estimation, and/or a transmit power headroom of the UE, among other examples. Accordingly, as described in further detail herein, a UE may select an RO within an RO partition that is associated with the category in which the UE is classified, and may transmit a preamble in the selected RO to initiate a RACH procedure. For example, in a four-step RACH procedure, the RO selected by the UE may implicitly signal a need for repetitions for a msg3 communication, whereby the network node may consider the RO selected by the UE to determine a msg3 repetition configuration to be indicated in a msg2 communication. The indication of the msg3 repetition configuration may be in DCI for the msg2 communication, or the indication may be included as an added field in the MAC RAR, a MAC sub-PDU, in the msg2 communication, or as a part of a MAC sub-PDU other than the MAC RAR in the msg2 communication. Alternatively, in a two-step RACH procedure, the RO selected by the UE may be associated with a PUSCH occasion that includes an uplink resource allocation based on the uplink transmission capabilities associated with the RO. In this way, the UE may transmit multiple repetitions of a msgA payload in the PUSCH occasion associated with the selected RO. In this way, the network node may configure multiple RO partitions, PRACH preamble partitions, and/or PUSCH occasions for UEs with different uplink transmission capabilities to enable different uplink resource allocations in a RACH procedure that is performed before a UE has established an RRC connection or otherwise signaled any uplink transmission capabilities to the network.

As indicated above, FIG. 5 is provided as an example. Other examples may differ from what is described with regard to FIG. 5.

Figure 6A:
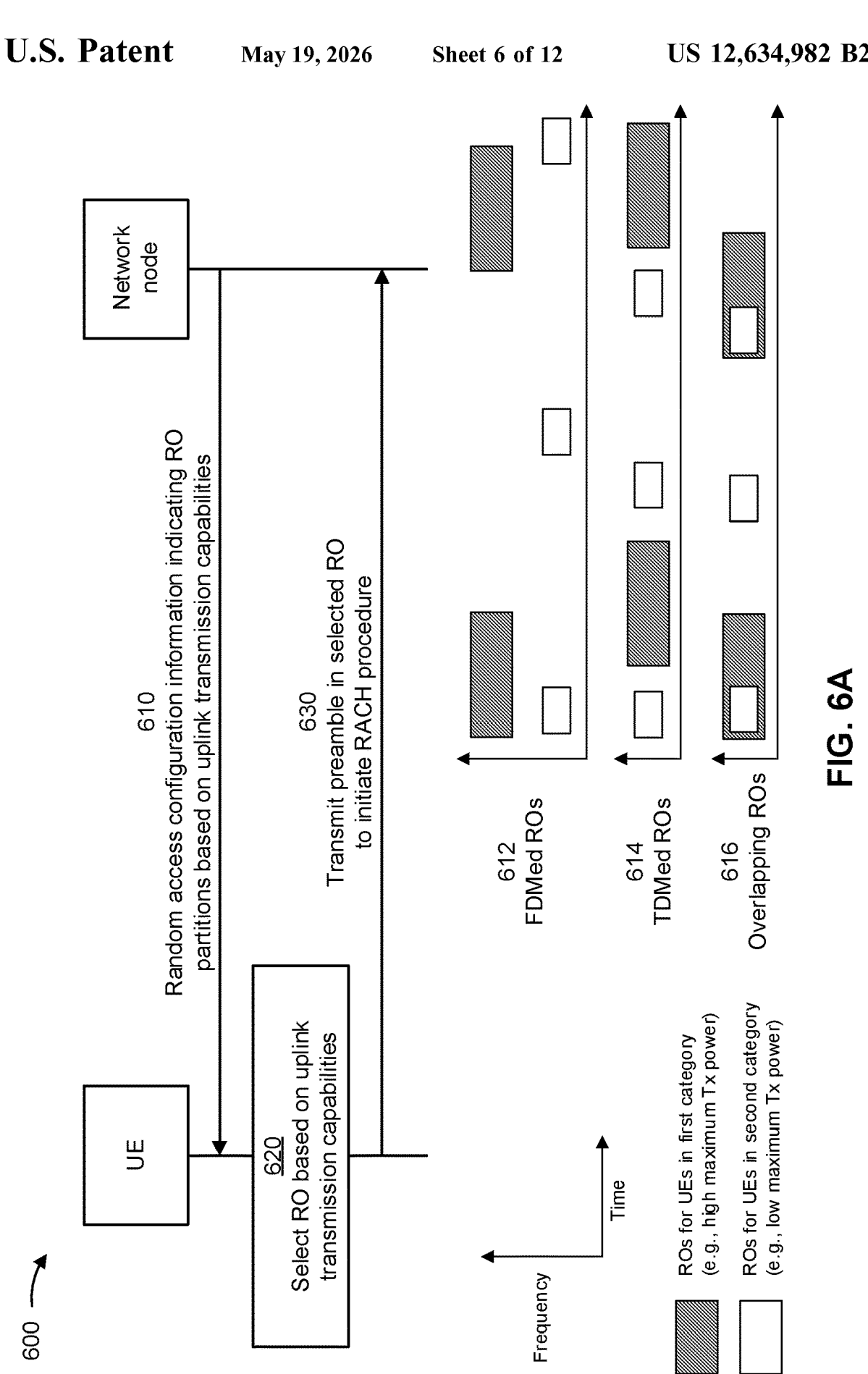
Figure 6C:
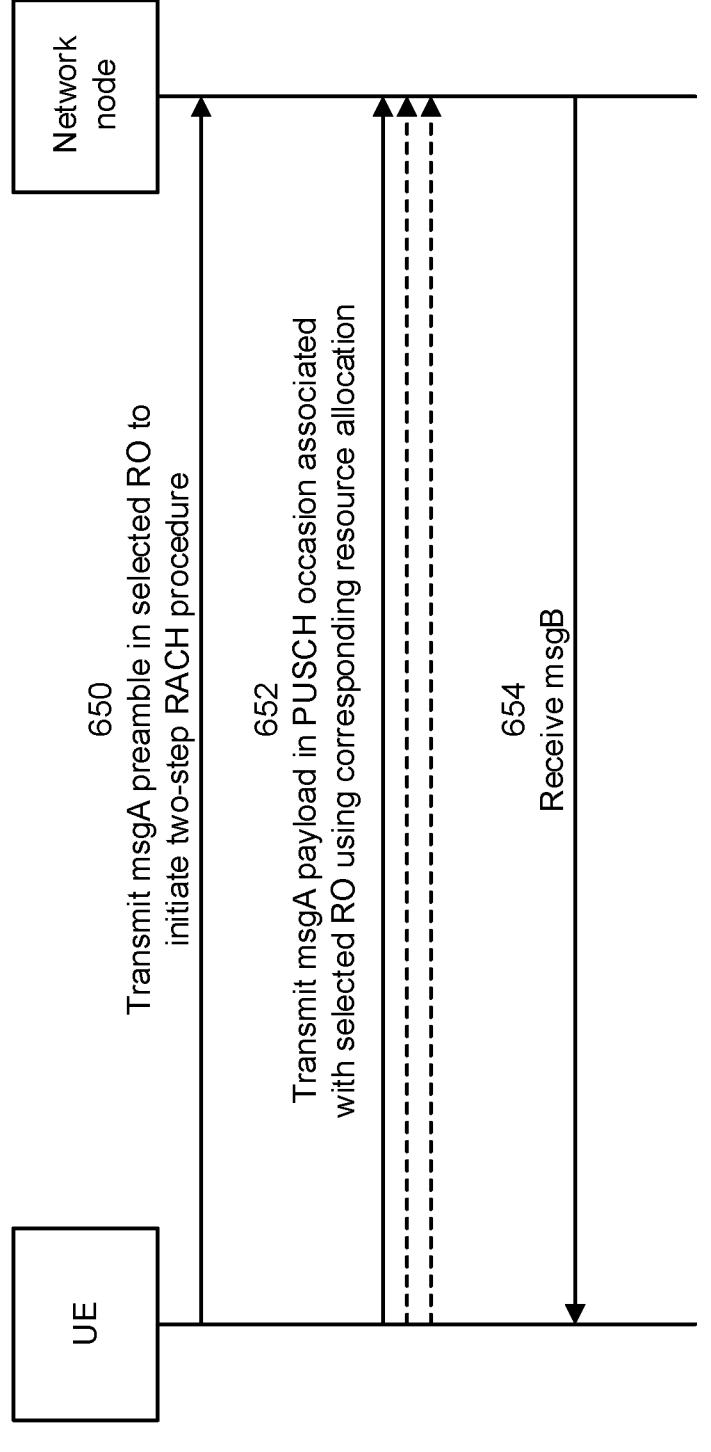

FIGS. 6A-6C are diagrams illustrating examples 600 associated with RO selection based on UE transmission capabilities, in accordance with the present disclosure. As shown in FIGS. 6A-6C, examples 600 include communication between a UE (e.g., UE 120) and a network node (e.g., base station 110, satellite 520, satellite 540, and/or gateway 550, among other examples). In some aspects, the UE and the network node may communicate in a wireless network, such as wireless network 100, which may be a terrestrial network, a non-terrestrial network (NTN) associated with a regenerative or transparent deployment, an air-to-ground (ATG) communication system, and/or any other suitable network in which uplink transmission capabilities may vary among different UEs communicating with the network node.

As shown in FIG. 6A, and by reference number 610, the network node may transmit, and the UE may receive, random access configuration information that indicates multiple RO partitions that are associated with multiple UE categories based on differences in UE uplink transmission capabilities. For example, in some aspects, the random access configuration information may include a system information block (SIB), an RRC message, and/or another suitable message to indicate the multiple RO partitions. In some aspects, the random access configuration may optionally indicate PRACH preamble partitions that are based on differences in UE uplink transmission capabilities (e.g., for a four-step or two-step RACH procedure) and/or PUSCH occasion partitions that are based on differences in UE uplink transmission capabilities (e.g., for a two-step RACH procedure where the UE transmits a msgA payload before receiving a downlink message that can otherwise indicate a PUSCH resource allocation, such as a msg2 communication in a four-step RACH procedure).

In some aspects, as described herein, the multiple RO partitions may be associated with different UE categories, which may be defined based on one or more metrics that relate to uplink transmission capabilities. For example, in some aspects, the multiple RO partitions may include a first RO partition (e.g., a first set of ROs) that are configured for UEs that have a higher maximum transmit power and a second RO partition (e.g., a second set of ROs) that are configured for UEs that have a lower maximum transmit power. For example, in an NTN, the first RO partition may be configured for UEs (e.g., VSAT UEs) that have a maximum transmit power up to 5 watts, and the second RO partition may be configured for UEs (e.g., smartphones) that have a maximum transmit power up to 200 mW. In another example, in a terrestrial network, the first RO partition may be configured for UEs (e.g., FWA devices) that have a maximum transmit power up to 35 decibel-milliwatts (dBm), and the second RO partition may be configured for UEs in power class 3 (e.g., smartphones) that have a maximum transmit power up to 23 dBm and/or UEs that have a maximum transmit power up to 20 dBm or 14 dBm (e.g., RedCap UEs).

In some aspects, the multiple RO partitions configured by the network node may have different configurations to distinguish the multiple RO partitions and minimize interference between different RO partitions. For example, as shown by reference number 612, different RO partitions may be frequency division multiplexed (FDMed), where ROs in different RO partitions are associated with different frequency domain resource allocations (e.g., ROs in different RO partitions are located in different sub-bands, bandwidth parts, and/or component carriers, among other examples). In another example, as shown by reference number 614, different RO partitions may be time division multiplexed (TDMed), where ROs in different RO partitions are associated with the same frequency domain resource allocation but are non-overlapping in a time domain (e.g., the ROs in different RO partitions occupy different slots, symbols, or other transmission time intervals). In another example, as shown by reference number 616, different RO partitions may be associated with an overlapping resource allocation (e.g., where ROs in different RO partitions can occupy the same time and frequency resource(s)), in which case preambles associated with the different RO partitions may use the same root sequence with different cyclic shifts (such that the preambles in different RO partitions are orthogonal), or the preambles associated with the different RO partitions may use different root sequences (such that the preambles in different RO partitions have a small correlation, even though the preambles may not be exactly orthogonal). In this way, the network node may configure the ROs in different RO partitions to minimize interference between the different RO partitions.

In some aspects, as described above, the multiple RO partitions may be associated with different UE categories that are generally based on one or more metrics that relate to uplink transmission capabilities. For example, the one or more metrics may include a maximum uplink transmit power, whereby the UE may be classified within a particular category (corresponding to a particular RO partition) based at least in part on a maximum uplink transmit power supported by the UE. However, in some cases, uplink reliability may depend on various factors in addition to and/or other than a maximum uplink transmit power. For example, uplink transmissions may be more reliable for a UE with a low maximum uplink transmit power relative to a UE with a high maximum uplink transmit power when the UE with the low maximum uplink transmit power channel quality is experiencing better channel quality. In another example, a UE that supports a high maximum transmit power may have a relatively low power headroom (e.g., an available remaining transmit power) when the UE is subject to an uplink power constraint, such as a maximum permissible exposure limitation. Accordingly, in some aspects, the multiple RO partitions may be associated with different UE categories that are based on a combination of metrics that relate to uplink transmission capabilities and/or a metric that is based on a combination of parameters that relate to uplink transmission capabilities, among other examples.

For example, in some aspects, the different UE categories that are associated with the multiple RO partitions may be based on a combination of a maximum uplink transmit power and a parameter that relates to channel quality (e.g., an RSRP measurement). For example, the different RO partitions may be associated with a metric that is based on a product of the maximum uplink transmit power supported by the UE and the RSRP measured by the UE, whereby a first RO partition may be configured for UEs for which the product has a higher value (e.g., where the product of the maximum uplink transmit power supported by the UE and the measured RSRP is in a first range) and a second RO partition may be configured for UEs for which the product has a lower value (e.g., where the product of the maximum uplink transmit power supported by the UE and the measured RSRP is in a second range). Additionally, or alternatively, the metric may be based on a combination of parameters, such as the maximum uplink transmit power, measurement(s) related to channel quality, the accuracy that the UE can achieve for an autonomous timing advance (TA) and/or a carrier frequency offset (CFO) estimation (e.g., the UE may be able to achieve a more accurate autonomous TA and/or CFO with a high-quality GNSS receiver or more frequent GNSS readings), and/or transmit power headroom (or available remaining transmit power) associated with the UE, among other examples. A higher accuracy on the CFO estimation may allow the UE to perform a more accurate frequency compensation for uplink transmissions.

Accordingly, as described herein, the multiple ROs may generally be configured for different UEs that have different uplink transmission capabilities, which may indicate different needs for uplink repetitions (e.g., a UE with a lower maximum transmit power, poor channel quality, inaccurate TA and/or CFO estimation capabilities, and/or low power headroom may need to transmit msg3 or msgA using more repetitions than a UE with a higher maximum transmit power, good channel quality, accurate TA and/or CFO estimation capabilities, and/or high power headroom). Furthermore, in cases where the multiple RO partitions are configured for a two-step RACH procedure, where there is no downlink message providing an opportunity to configure msgA repetitions based on uplink transmission capabilities, the metric(s) that are associated with the different RO partitions may be further based on a need for msgA repetitions (e.g., a number of msgA repetitions and/or a need for msgA redundancy, such as cross-slot scheduling and/or a large transport block size).

As further shown in FIG. 6A, and by reference number 620, the UE may select an RO from an RO partition based at least in part on uplink transmission capabilities of the UE. For example, in some aspects, the UE may determine an RO partition from which to select an RO based on one or more metrics that relate to the maximum uplink transmit power supported by the UE, an RSRP measured by the UE, an achievable accuracy for an autonomous TA and/or CFO estimation, and/or transmit power headroom at the UE, among other examples. Furthermore, in cases where the UE is selecting an RO to initiate a two-step RACH procedure, the UE may optionally further determine the RO partition from which to select an RO based on a number of repetitions the UE needs to use to transmit the msgA payload and/or a need for msgA redundancy.

As further shown in FIG. 6A, and by reference number 630, the UE may transmit, and the network node may receive, a preamble in the RO selected by the UE. For example, as described herein, the preamble may be transmitted in a random access message to initiate a RACH procedure (e.g., as msg1 to initiate a four-step RACH procedure, as described above with reference to FIG. 3, or as a msgA preamble to initiate a two-step RACH procedure, as described above with reference to FIG. 4). In some aspects, each RO partition may be associated with a set of PRACH preambles, and the UE may select the preamble that is transmitted in the RO from the set of PRACH preambles associated with the RO partition. Additionally, or alternatively, in some aspects, the random access configuration information may indicate a PRACH preamble partition that is based on differences in UE uplink transmission capabilities. For example, in some aspects, an RO may be associated with a PRACH preamble partition, where PRACH preambles associated with the RO are partitioned into different sets or subsets based on one or more metrics that relate to uplink transmission capabilities (e.g., maximum uplink transmit power, channel quality based on an RSRP measurement, an autonomous TA accuracy, a CFO estimation accuracy, and/or transmit power headroom, among other examples). In such cases, the UE may select a PRACH preamble partition based on the one or more metrics, which may be the same or different from the one or more metrics used to select the RO partition, and the UE may select a preamble to be transmitted in the RO based on the PRACH preamble partition that corresponds to the uplink transmission capabilities of the UE. Additionally, or alternatively, a combination of ROs and PRACH preambles may be configured for different UE categories based on uplink transmission capabilities (e.g., the UE may select an RO and a PRACH preamble from a first set that includes a first combination of ROs and PRACH preambles if the metric associated with the UE is in a first range or from a second set that includes a second combination of ROs and PRACH preambles if the metric associated with the UE is in a second range).

Accordingly, as described herein, the UE may transmit the preamble in the selected RO to initiate a four-step or two-step RACH procedure, and the UE and the network node may exchange further RACH messages to establish an RRC connection based on the preamble transmission. For example, as described in further detail below, the further RACH messages may include one or more uplink messages that are associated with an uplink resource allocation based on the RO in which the preamble is transmitted and/or based on the preamble that is transmitted in the RO.

For example, as shown in FIG. 6B, and by reference number 640, the preamble that the UE transmits in the selected RO may be a msg1 preamble that the UE transmits to the network node to initiate a four-step RACH procedure. In this case, the RO partition and/or the PRACH preamble partition indicated in the random access configuration information may indicate a number of repetitions for a msg3 transmission by the UE. For example, the number of msg3 repetitions associated with an RO partition and/or a preamble partition may be indicated in a SIB and/or a msg2 communication that is sent from the network node to the UE as a reply to the msg1 preamble. For example, a first RO partition and/or a first PRACH preamble partition may be configured for UEs that need a first number of repetitions for the msg3 transmission, and a second RO partition and/or a second PRACH preamble partition may be configured for UEs that need a second number of repetitions for the msg3 transmission, where the first number of repetitions is different from the second number of repetitions. Accordingly, as further shown by reference number 642, the network node may determine a repetition configuration for the msg3 transmission based on the RO partition that includes the RO in which the UE transmitted the preamble and/or based on the preamble that the UE transmitted in the RO. For example, the selected RO partition and/or the selected PRACH preamble partition may indicate the number of msg3 repetitions needed for the UE, whereby the network node may determine the repetition configuration for the msg3 transmission by the UE based at least in part on the RO partition and/or the PRACH preamble partition selected by the UE. For example, the msg3 repetition configuration may include a number of repetitions for the subsequent msg3 transmission by the UE and/or may indicate a transmit power control (TPC) value for the msg3 transmission based at least in part on the RO partition and/or the PRACH preamble partition selected by the UE. For example, ranges for the TPC values for the msg3 transmission may vary for different RO partitions, whereby the network node may determine the TPC value for the msg3 transmission by the UE based on the RO partition and/or the PRACH preamble partition selected by the UE. Furthermore, in some aspects, the network node may consider other factors, such as available resources and/or processing capabilities at the network node, when determining the repetition configuration for the msg3 transmission.

Accordingly, as shown by reference number 644, the network node may transmit an RAR (msg2 communication) to the UE as a reply to the preamble, and the RAR may indicate the repetition configuration to be applied by the UE for the subsequent msg3 communication. For example, the RAR may indicate the preamble identifier received from the UE in the msg1 transmission and may further indicate an uplink resource allocation to be used by the UE for the msg3 communication, including a number of msg3 repetitions to be transmitted by the UE and/or a TPC value to be applied for the msg3 repetitions. As further shown by reference number 646, the UE may then transmit one or more msg3 repetitions based on the repetition configuration indicated in the RAR. As shown by reference number 648, the network node may transmit, to the UE, a msg4 communication that indicates a detected identifier of the UE, a timing advance value to be applied by the UE for uplink transmissions, and/or contention resolution information, among other examples. For example, as described herein, the network node may transmit the msg4 communication based on successfully receiving and decoding one or more of the msg3 repetitions, which may be associated with an increased reliability by configuring a number of repetitions and/or TPC value based on the uplink transmission capabilities that are signaled by the UE selection of an RO partition and/or a PRACH preamble partition for the msg1 transmission.

Alternatively, as shown in FIG. 6C, and by reference number 650, the preamble that the UE transmits in the selected RO may be a msgA preamble that the UE transmits to the network node to initiate a two-step RACH procedure. In this case, because the network node does not transmit a downlink message that may indicate a repetition configuration for a msgA payload, the RO partition and/or the PRACH preamble partition selected by the UE may be associated with the number of repetitions to be used for the msgA payload. Furthermore, because there is no downlink message similar to msg2 to indicate an uplink resource allocation for a msgA payload transmission in a two-step RACH procedure, each RO that is configured for the two-step RACH procedure may be associated with a PUSCH occasion that includes an uplink resource allocation for a subsequent msgA payload transmission. For example, in some aspects, the multiple RO partitions may include at least a first RO partition and a second RO partition, where an uplink resource allocation for PUSCH occasions associated with ROs in the first RO partition may differ from an uplink resource allocation for PUSCH occasions associated with ROs in the second RO partition. Accordingly, as further shown by reference number 652, the UE may transmit one or more msgA payload repetitions based on the repetition configuration associated with the RO partition that includes the RO in which the msgA preamble is transmitted and/or based on the repetition configuration associated with the PRACH preamble partition that includes the msgA preamble transmitted by the UE. Furthermore, in some aspects, the UE may construct the msgA payload based on the uplink resource allocation associated with the RO in which the msgA preamble is transmitted, and may transmit the one or more msgA payload repetitions in the PUSCH occasion associated with the RO in which the msgA preamble is transmitted.

As further shown by reference number 654, the network node may transmit, to the UE, a msgB communication as a reply to the msgA preamble and the msgA payload. For example, as described above, the network node may receive the msgA preamble transmitted by the UE, and may then receive and decode the msgA payload based on successfully receiving and decoding the msgA preamble. Accordingly, the network node may transmit the msgB communication based on successfully receiving and decoding one or more repetitions of the msgA payload, which may be associated with an increased reliability by the UE selecting an RO partition and/or PRACH preamble partition that is associated with a number of msgA repetitions based on the uplink transmission capabilities of the UE.

As indicated above, FIGS. 6A-6C are provided as examples. Other examples may differ from what is described with regard to FIGS. 6A-6C.

FIG. 7 is a diagram illustrating an example process 700 performed, for example, by a UE, in accordance with the present disclosure. Example process 700 is an example where the UE (e.g., UE 120) performs operations associated with RO selection based on UE transmission capabilities.

As shown in FIG. 7, in some aspects, process 700 may include receiving, from a network node, signaling that indicates at least a first RO partition and a second RO partition, wherein the first RO partition is associated with different uplink transmission capabilities than the second RO partition (block 710). For example, the UE (e.g., using reception component 902, depicted in FIG. 9) may receive, from a network node, signaling that indicates at least a first RO partition and a second RO partition, wherein the first RO partition is associated with different uplink transmission capabilities than the second RO partition, as described above.

As further shown in FIG. 7, in some aspects, process 700 may include selecting an RO in the first RO partition or the second RO partition based at least in part on a metric that relates to an uplink transmission capability of the UE (block 720). For example, the UE (e.g., using selection component 908, depicted in FIG. 9) may select an RO in the first RO partition or the second RO partition based at least in part on a metric that relates to an uplink transmission capability of the UE, as described above.

As further shown in FIG. 7, in some aspects, process 700 may include transmitting a preamble in the selected RO to initiate a RACH procedure (block 730). For example, the UE (e.g., using transmission component 904, depicted in FIG. 9) may transmit a preamble in the selected RO to initiate a RACH procedure, as described above.

Process 700 may include additional aspects, such as any single aspect or any combination of aspects described below and/or in connection with one or more other processes described elsewhere herein.

In a first aspect, ROs in the first RO partition are FDMed or TDMed with ROs in the second RO partition.

In a second aspect, alone or in combination with the first aspect, ROs in the first RO partition and ROs in the second RO partition are associated with overlapping time and frequency resources.

In a third aspect, alone or in combination with one or more of the first and second aspects, the ROs in the first RO partition and the ROs in the second RO partition are associated with different cyclic shifts and a same root sequence or are associated with different root sequences.

In a fourth aspect, alone or in combination with one or more of the first through third aspects, the metric that relates to the uplink transmission capability of the UE is based at least in part on a maximum transmit power of the UE.

In a fifth aspect, alone or in combination with one or more of the first through fourth aspects, the metric that relates to the uplink transmission capability of the UE is further based at least in part on one or more of a channel quality measurement, an autonomous timing advance accuracy, a carrier frequency offset estimation accuracy, or a transmit power headroom.

In a sixth aspect, alone or in combination with one or more of the first through fifth aspects, the first RO partition is associated with a first TPC value range for a msg3 communication and the second RO partition is associated with a second TPC value range for the msg3 communication.

In a seventh aspect, alone or in combination with one or more of the first through sixth aspects, process 700 includes selecting, within the RO and based at least in part on the metric that relates to the uplink transmission capability of the UE, the preamble to be transmitted in the RO from a first set of PRACH preambles or a second set of PRACH preambles, wherein the first set of PRACH preambles and the second set of PRACH preambles are associated with different uplink transmission capabilities.

In an eighth aspect, alone or in combination with one or more of the first through seventh aspects, process 700 includes selecting, based at least in part on the metric that relates to the uplink transmission capability of the UE, the preamble to be transmitted in the RO from a first set of RO and PRACH preamble combinations or a second set of RO and PRACH preamble combinations, wherein the first set of RO and PRACH preamble combinations and the second set of RO and PRACH preamble combinations are associated with different uplink transmission capabilities.

In a ninth aspect, alone or in combination with one or more of the first through eighth aspects, the first RO partition is associated with a first number of repetitions for a msg3 communication and the second RO partition is associated with a second number of repetitions for the msg3 communication.

In a tenth aspect, alone or in combination with one or more of the first through ninth aspects, the RO in which the preamble is transmitted indicates whether the UE needs the first number of repetitions for the msg3 communication or the second number of repetitions for the msg3 communication.

In an eleventh aspect, alone or in combination with one or more of the first through tenth aspects, process 700 includes receiving a msg2 communication that indicates a repetition configuration for the msg3 communication based at least in part on the RO in which the preamble is transmitted.

In a twelfth aspect, alone or in combination with one or more of the first through eleventh aspects, the RO is associated with a PUSCH occasion having a resource allocation that is based at least in part on the metric that relates to the uplink transmission capability of the UE.

In a thirteenth aspect, alone or in combination with one or more of the first through twelfth aspects, process 700 includes generating a msgA payload based at least in part on the resource allocation for the PUSCH occasion associated with the RO, and transmitting the msgA payload in the PUSCH occasion associated with the RO.

In a fourteenth aspect, alone or in combination with one or more of the first through thirteenth aspects, the network node is an NTN node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., base station 110, satellite 520, satellite 540, and/or gateway 550, among other examples) performs operations associated with RO selection based on UE transmission capabilities.

As shown in FIG. 8, in some aspects, process 800 may include transmitting signaling that indicates at least a first RO partition and a second RO partition based at least in part on a metric that relates to uplink transmission capabilities (block 810). For example, the network node (e.g., using transmission component 1004, depicted in FIG. 10) may transmit signaling that indicates at least a first RO partition and a second RO partition based at least in part on a metric that relates to uplink transmission capabilities, as described above.

As further shown in FIG. 8, in some aspects, process 800 may include receiving, from a UE, a preamble in an RO associated with the first RO partition or the second RO partition, wherein the RO in which the preamble is transmitted indicates the uplink transmission capabilities of the UE (block 820). For example, the network node (e.g., using reception component 1002, depicted in FIG. 10) may receive, from a UE, a preamble in an RO associated with the first RO partition or the second RO partition, wherein the RO in which the preamble is transmitted indicates the uplink transmission capabilities of the UE, as described above.

Process 800 may include additional aspects, such as any single aspect or any combination of aspects described below and/or in connection with one or more other processes described elsewhere herein.

In a first aspect, ROs in the first RO partition are FDMed or TMDed with ROs in the second RO partition.

In a second aspect, alone or in combination with the first aspect, ROs in the first RO partition and ROs in the second RO partition are associated with overlapping time and frequency resources.

In a third aspect, alone or in combination with one or more of the first and second aspects, the ROs in the first RO partition and the ROs in the second RO partition are associated with different cyclic shifts and a same root sequence or are associated with different root sequences.

In a fourth aspect, alone or in combination with one or more of the first through third aspects, the metric that relates to the uplink transmission capabilities is based at least in part on a maximum transmit power.

In a fifth aspect, alone or in combination with one or more of the first through fourth aspects, the metric that relates to the uplink transmission capabilities is further based at least in part on one or more of a channel quality measurement, an autonomous timing advance accuracy, a carrier frequency offset estimation accuracy, or a transmit power headroom.

In a sixth aspect, alone or in combination with one or more of the first through fifth aspects, the first RO partition is associated with a first TPC value range for a msg3 communication and the second RO partition is associated with a second TPC value range for the msg3 communication.

In a seventh aspect, alone or in combination with one or more of the first through sixth aspects, the signaling further indicates, within each RO, a preamble partition that includes a first set of PRACH preambles and a second set of PRACH preambles that are based at least in part on the metric that relates to the uplink transmission capabilities.

In an eighth aspect, alone or in combination with one or more of the first through seventh aspects, the signaling further indicates a first set of RO and PRACH preamble combinations and a second set of RO and PRACH preamble combinations that are based at least in part on the metric that relates to the uplink transmission capabilities.

In a ninth aspect, alone or in combination with one or more of the first through eighth aspects, the first RO partition is associated with a first number of repetitions for a msg3 communication and the second RO partition is associated with a second number of repetitions for the msg3 communication.

In a tenth aspect, alone or in combination with one or more of the first through ninth aspects, process 800 includes determining whether the UE needs the first number of repetitions for the msg3 communication or the second number of repetitions for the msg3 communication based at least in part on the RO in which the preamble is transmitted.

In an eleventh aspect, alone or in combination with one or more of the first through tenth aspects, process 800 includes transmitting, to the UE, a msg2 communication that indicates a repetition configuration for the msg3 communication based at least in part on the RO in which the preamble is transmitted.

In a twelfth aspect, alone or in combination with one or more of the first through eleventh aspects, the RO is associated with a PUSCH occasion having a resource allocation that is based at least in part on the metric that relates to the uplink transmission capabilities.

In a thirteenth aspect, alone or in combination with one or more of the first through twelfth aspects, process 800 includes receiving a msgA payload in the PUSCH occasion associated with the RO.

In a fourteenth aspect, alone or in combination with one or more of the first through thirteenth aspects, the network node is an NTN node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
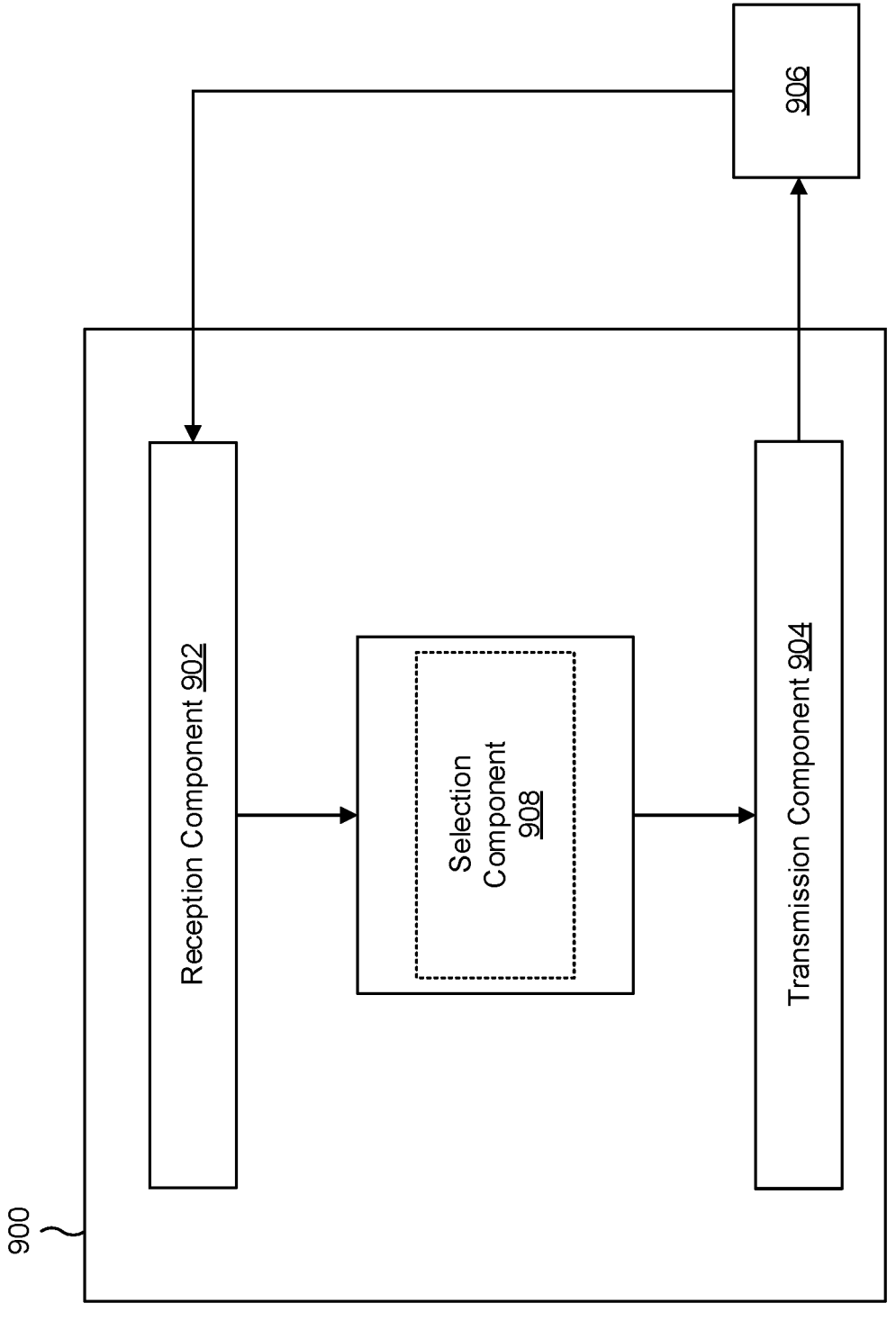
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a selection component 908, among other examples.

In some aspects, the apparatus 900 may be configured to perform one or more operations described herein in connection with FIGS. 6A-6C. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a network node, signaling that indicates at least a first RO partition and a second RO partition, wherein the first RO partition is associated with different uplink transmission capabilities than the second RO partition. The selection component 908 may select an RO in the first RO partition or the second RO partition based at least in part on a metric that relates to an uplink transmission capability of the UE. The transmission component 904 may transmit a preamble in the selected RO to initiate a RACH procedure.

The selection component 908 may select, within the RO and based at least in part on the metric that relates to the uplink transmission capability of the UE, the preamble to be transmitted in the RO from a first set of PRACH preambles or a second set of PRACH preambles, wherein the first set of PRACH preambles and the second set of PRACH preambles are associated with different uplink transmission capabilities.

The selection component 908 may select, based at least in part on the metric that relates to the uplink transmission capability of the UE, the preamble to be transmitted in the RO from a first set of RO and PRACH preamble combinations or a second set of RO and PRACH preamble combinations, wherein the first set of RO and PRACH preamble combinations and the second set of RO and PRACH preamble combinations are associated with different uplink transmission capabilities.

The reception component 902 may receive a msg2 communication that indicates a repetition configuration for the msg3 communication based at least in part on the RO in which the preamble is transmitted.

The transmission component 904 may generate a msgA payload based at least in part on the resource allocation for the PUSCH occasion associated with the RO. The transmission component 904 may transmit the msgA payload in the PUSCH occasion associated with the RO.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
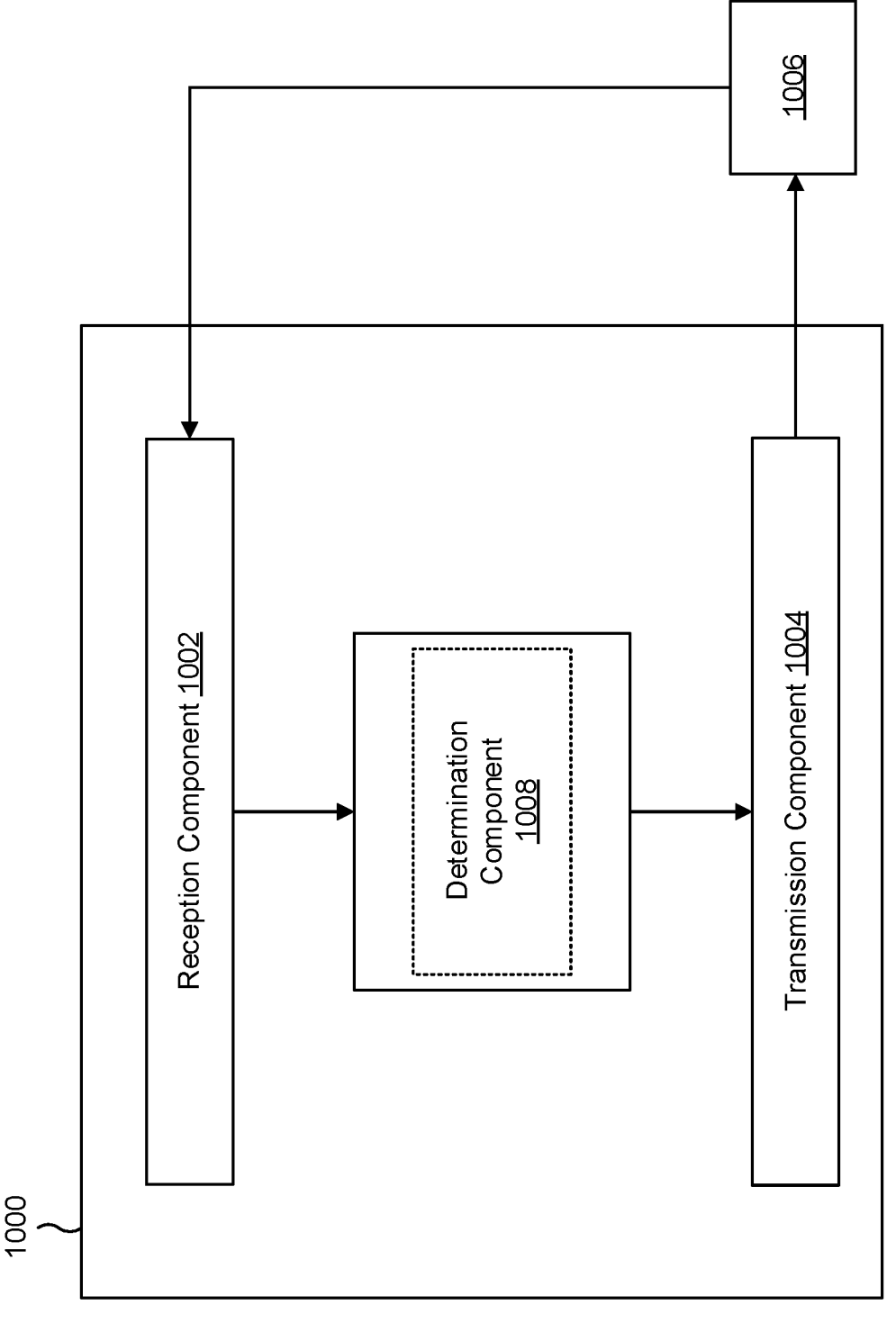

FIG. 10 is a block diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component

1004. As further shown, the apparatus 1000 may include a determination component 1008, among other examples.

In some aspects, the apparatus 1000 may be configured to perform one or more operations described herein in connection with FIGS. 6A-6C. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit signaling that indicates at least a first RO partition and a second RO partition based at least in part on a metric that relates to uplink transmission capabilities. The reception component 1002 may receive, from a UE, a preamble in an RO associated with the first RO partition or the second RO partition, wherein the RO in which the preamble is transmitted indicates the uplink transmission capabilities of the UE.

The determination component 1008 may determine whether the UE needs a first number of repetitions for a msg3 communication or a second number of repetitions for the msg3 communication based at least in part on the RO in which the preamble is transmitted.

The transmission component 1004 may transmit, to the UE, a msg2 communication that indicates a repetition configuration for a msg3 communication based at least in part on the RO in which the preamble is transmitted.

The reception component 1002 may receive a msgA payload in a PUSCH occasion associated with the RO.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network node, signaling that indicates at least a first RO partition and a second RO partition, wherein the first RO partition is associated with different uplink transmission capabilities than the second RO partition; selecting an RO in the first RO partition or the second RO partition based at least in part on a metric that relates to an uplink transmission capability of the UE; and transmitting a preamble in the selected RO to initiate a RACH procedure.

Aspect 2: The method of Aspect 1, wherein ROs in the first RO partition are FDMed or TDMed with ROs in the second RO partition.

Aspect 3: The method of Aspect 1, wherein ROs in the first RO partition and ROs in the second RO partition are associated with overlapping time and frequency resources.

Aspect 4: The method of Aspect 3, wherein the ROs in the first RO partition and the ROs in the second RO partition are associated with different cyclic shifts and a same root sequence or are associated with different root sequences.

Aspect 5: The method of any of Aspects 1-4, wherein the metric that relates to the uplink transmission capability of the UE is based at least in part on a maximum transmit power of the UE.

Aspect 6: The method of Aspect 5, wherein the metric that relates to the uplink transmission capability of the UE is further based at least in part on one or more of a channel quality measurement, an autonomous timing advance accuracy, a carrier frequency offset estimation accuracy, or a transmit power headroom.

Aspect 7: The method of any of Aspects 1-6, wherein the first RO partition is associated with a first TPC value range for a msg3 communication and the second RO partition is associated with a second TPC value range for the msg3 communication.

Aspect 8: The method of any of Aspects 1-7, further comprising: selecting, within the RO and based at least in part on the metric that relates to the uplink transmission capability of the UE, the preamble to be transmitted in the RO from a first set of PRACH preambles or a second set of PRACH preambles, wherein the first set of PRACH preambles and the second set of PRACH preambles are associated with different uplink transmission capabilities.

Aspect 9: The method of any of Aspects 1-7, further comprising: selecting, based at least in part on the metric that relates to the uplink transmission capability of the UE, the preamble to be transmitted in the RO from a first set of RO and PRACH preamble combinations or a second set of RO and PRACH preamble combinations, wherein the first set of RO and PRACH preamble combinations and the second set of RO and PRACH preamble combinations are associated with different uplink transmission capabilities.

Aspect 10: The method of any of Aspects 1-9, wherein the first RO partition is associated with a first number of repetitions for a msg3 communication and the second RO partition is associated with a second number of repetitions for the msg3 communication.

Aspect 11: The method of Aspect 10, wherein the RO in which the preamble is transmitted indicates whether the UE needs the first number of repetitions for the msg3 communication or the second number of repetitions for the msg3 communication.

Aspect 12: The method of any of Aspects 10-11, further comprising: receiving a msg2 communication that indicates a repetition configuration for the msg3 communication based at least in part on the RO in which the preamble is transmitted.

Aspect 13: The method of any of Aspects 1-6 or 8-9, wherein the RO is associated with a PUSCH occasion having a resource allocation that is based at least in part on the metric that relates to the uplink transmission capability of the UE.

Aspect 14: The method of Aspect 13, further comprising: generating a msgA payload based at least in part on the resource allocation for the PUSCH occasion associated with the RO; and transmitting the msgA payload in the PUSCH occasion associated with the RO.

Aspect 15: The method of any of Aspects 1-14, wherein the network node is an NTN node.

Aspect 16: A method of wireless communication performed by a network node, comprising: transmitting signaling that indicates at least a first RO partition and a second RO partition based at least in part on a metric that relates to uplink transmission capabilities; and receiving, from a UE, a preamble in an RO associated with the first RO partition or the second RO partition, wherein the RO in which the preamble is transmitted indicates the uplink transmission capabilities of the UE.

Aspect 17: The method of Aspect 16, wherein ROs in the first RO partition are FDMed or TDMed with ROs in the second RO partition.

Aspect 18: The method of Aspect 16, wherein ROs in the first RO partition and ROs in the second RO partition are associated with overlapping time and frequency resources.

Aspect 19: The method of Aspect 18, wherein the ROs in the first RO partition and the ROs in the second RO partition are associated with different cyclic shifts and a same root sequence or are associated with different root sequences.

Aspect 20: The method of any of Aspects 16-19, wherein the metric that relates to the uplink transmission capabilities is based at least in part on a maximum transmit power.

Aspect 21: The method of Aspect 20, wherein the metric that relates to the uplink transmission capabilities is further based at least in part on one or more of a channel quality measurement, an autonomous timing advance accuracy, a carrier frequency offset estimation accuracy, or a transmit power headroom.

Aspect 22: The method of any of Aspects 16-21, wherein the first RO partition is associated with a first TPC value range for a msg3 communication and the second RO partition is associated with a second TPC value range for the msg3 communication.

Aspect 23: The method of any of Aspects 16-22, wherein the signaling further indicates, within each RO, a preamble partition that includes a first set of PRACH preambles and a second set of PRACH preambles that are based at least in part on the metric that relates to the uplink transmission capabilities.

Aspect 24: The method of any of Aspects 16-22, wherein the signaling further indicates a first set of RO and PRACH preamble combinations and a second set of RO and PRACH preamble combinations that are based at least in part on the metric that relates to the uplink transmission capabilities.

Aspect 25: The method of any of Aspects 16-24, wherein the first RO partition is associated with a first number of repetitions for a msg3 communication and the second RO partition is associated with a second number of repetitions for the msg3 communication.

Aspect 26: The method of Aspect 25, further comprising: determining whether the UE needs the first number of repetitions for the msg3 communication or the second number of repetitions for the msg3 communication based at least in part on the RO in which the preamble is transmitted.

Aspect 27: The method of any of Aspects 25-26, further comprising: transmitting, to the UE, a msg2 communication that indicates a repetition configuration for the msg3 communication based at least in part on the RO in which the preamble is transmitted.

Aspect 28: The method of any of Aspects 16-21 or 23-25, wherein the RO is associated with a PUSCH occasion having a resource allocation that is based at least in part on the metric that relates to the uplink transmission capabilities.

Aspect 29: The method of Aspect 28, further comprising: receiving a msgA payload in the PUSCH occasion associated with the RO.

Aspect 30: The method of any of Aspects 16-29, wherein the network node is an NTN node.

Aspect 31: An apparatus for wireless communication at a device, comprising a processor; memory coupled with the processor; and instructions stored in the memory and executable by the processor to cause the apparatus to perform the method of any of Aspects 1-15.

Aspect 32: A device for wireless communication, comprising a memory and one or more processors coupled to the memory, the memory and the one or more processors configured to perform the method of any of Aspects 1-15.

Aspect 33: An apparatus for wireless communication, comprising at least one means for performing the method of any of Aspects 1-15.

Aspect 34: A non-transitory computer-readable medium storing code for wireless communication, the code comprising instructions executable by a processor to perform the method of any of Aspects 1-15.

Aspect 35: A non-transitory computer-readable medium storing a set of instructions for wireless communication, the set of instructions comprising one or more instructions that, when executed by one or more processors of a device, cause the device to perform the method of any of Aspects 1-15.

Aspect 36: An apparatus for wireless communication at a device, comprising a processor; memory coupled with the processor; and instructions stored in the memory and executable by the processor to cause the apparatus to perform the method of any of Aspects 16-30.

Aspect 37: A device for wireless communication, comprising a memory and one or more processors coupled to the memory, the memory and the one or more processors configured to perform the method of any of Aspects 16-30.

Aspect 38: An apparatus for wireless communication, comprising at least one means for performing the method of any of Aspects 16-30.

Aspect 39: A non-transitory computer-readable medium storing code for wireless communication, the code comprising instructions executable by a processor to perform the method of any of Aspects 16-30.

Aspect 40: A non-transitory computer-readable medium storing a set of instructions for wireless communication, the set of instructions comprising one or more instructions that, when executed by one or more processors of a device, cause the device to perform the method of any of Aspects 16-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) comprising:
at least one transceiver;
one or more memories storing instructions; and
one or more processors configured to execute the instructions to cause the UE to:
    receive, via the at least one transceiver and from a network node, signaling that indicates a first random access channel (RACH) occasion (RO) partition and a second RO partition, wherein the first RO partition is associated with first uplink transmission capabilities that are different from second uplink transmission capabilities that are associated with the second RO partition;
    select an RO in the first RO partition or the second RO partition based at least in part on a metric that relates to an transmission capability of the first uplink transmission capabilities; and
    transmit, via the at least one transceiver, a preamble in the selected RO.

2. The UE of claim 1, wherein ROs in the first RO partition are frequency division multiplexed or time division multiplexed with the ROs in the second RO partition.

3. The UE of claim 1, wherein ROs in the first RO partition and ROs in the second RO partition are associated with overlapping time and frequency resources.

4. The UE of claim 3, wherein the ROs in the first RO partition and the ROs in the second RO partition are associated with different cyclic shifts and a same root sequence, or wherein the ROs in the first RO partition and the ROs in the second RO partition are associated with different root sequences.

5. The UE of claim 1, wherein the metric is based at least in part on a maximum transmit power of the UE.

6. The UE of claim 5, wherein the metric is further based at least in part on at least one of a channel quality measurement, an autonomous timing advance accuracy, a carrier frequency offset estimation accuracy, and a transmit power headroom.

7. The UE of claim 1, wherein the first RO partition is associated with a first transmit power control (TPC) value range and the second RO partition is associated with a second TPC value range, wherein the first TPC value range and the second TPC value range are associated with a msg3 communication.

8. The UE of claim 1, wherein the one or more processors are further configured to execute the instructions to cause the UE to:

select, based at least in part on the metric, the preamble to be transmitted in the selected RO from a first set of physical RACH (PRACH) preambles or a second set of PRACH preambles, wherein the first set of PRACH preambles are associated with the first uplink transmission capabilities and the second set of PRACH preambles are associated with the second uplink transmission capabilities.

9. The UE of claim 1, wherein the one or more processors are further configured to execute the instructions to cause the UE to:

select, based at least in part on the metric, the preamble to be transmitted in the selected RO from a first set of RO and physical RACH (PRACH) preamble combinations or a second set of RO and PRACH preamble combinations, wherein the first set of RO and PRACH preamble combinations are associated with the first uplink transmission capabilities and the second set of RO and PRACH preamble combinations are associated with the second uplink transmission capabilities.

10. The UE of claim 1, wherein the first RO partition is associated with a first quantity of repetitions and the second RO partition is associated with a second quantity of repetitions, wherein the first quantity of repetitions and the second quantity of repetitions are associated with a msg3 communication.

11. The UE of claim 10, wherein the RO in which the preamble is transmitted indicates whether the UE needs the first quantity of repetitions or the second quantity of repetitions.

12. The UE of claim 11, wherein the one or more processors are further configured to execute the instructions to cause the UE to:

receive a msg2 communication that indicates a repetition configuration associated with the msg3 communication based at least in part on the selected RO in which the preamble is transmitted.

13. The UE of claim 1, wherein the selected RO is associated with a physical uplink shared channel (PUSCH) occasion having a resource allocation that is based at least in part on the metric.

14. The UE of claim 13, wherein the one or more processors are further configured to execute the instructions to cause the UE to:

generate a msgA payload based at least in part on the resource allocation; and transmit the msgA payload in the PUSCH occasion.

15. The UE of claim 1, wherein the network node is a non-terrestrial network node.

16. A network node, comprising:

at least one transceiver one or more memories storing instructions; and one or more processors configured to execute the instructions to cause the network node to:

transmit, via the at least one transceiver, signaling that indicates a first random access channel (RACH) occasion (RO) partition and a second RO partition, the signaling being based at least in part on a metric that relates to uplink transmission capabilities; and receive, via the at least one transceiver and from a user equipment (UE), a preamble in an RO associated with the first RO partition or the second RO partition, wherein the RO indicates the uplink transmission capabilities of the UE.

17. The network node of claim 16, wherein ROs in the first RO partition are frequency division multiplexed or time division multiplexed with the ROs in the second RO partition.

18. The network node of claim 16, wherein ROs in the first RO partition and ROs in the second RO partition are associated with overlapping time and frequency resources.

19. The network node of claim 18, wherein the ROs in the first RO partition and the ROs in the second RO partition are associated with different cyclic shifts and a same root sequence, or wherein the ROs in the first RO partition and the ROs in the second RO partition are associated with different root sequences.

20. The network node of claim 16, wherein the metric is based at least in part on a maximum transmit power.

21. The network node of claim 20, wherein the metric is further based at least in part on at least one of a channel quality measurement, an autonomous timing advance accuracy, a carrier frequency offset estimation accuracy, and a transmit power headroom.

22. The network node of claim 16, wherein the first RO partition is associated with a first transmit power control (TPC) value range and the second RO partition is associated with a second TPC value range, wherein the first TPC value range and the second TPC value range are associated with a msg3 communication.

23. The network node of claim 16, wherein the signaling further indicates, within each RO, a preamble partition that includes a first set of physical RACH (PRACH) preambles and a second set of PRACH preambles, wherein the first set of PRACH preambles and the second set of PRACH preambles are based at least in part on the metric.

24. The network node of claim 16, wherein the signaling further indicates a first set of RO and physical RACH (PRACH) preamble combinations and a second set of RO and PRACH preamble combinations, wherein the first set of RO and PRACH preamble conditions and the second set of RO and PRACH preamble combinations are based at least in part on the metric.

25. The network node of claim 16, wherein the first RO partition is associated with a first quantity of repetitions and the second RO partition is associated with a second quantity of repetitions, wherein the first quantity of repetitions and the second quantity of repetitions are associated with a msg3 communication.

26. The network node of claim 25, wherein the one or more processors are further configured to execute the instructions to cause the network node to:

determine whether the UE needs the first quantity of repetitions or the second quantity of repetitions based at least in part on the RO.

27. The network node of claim 26, wherein the one or more processors are further configured to execute the instructions to cause the network node to:

transmit, via the at least one transceiver and to the UE, a msg2 communication that indicates a repetition configuration associated with the msg3 communication, the msg 2 communication being based at least in part on the RO.

28. The network node of claim 16, wherein the RO is associated with a physical uplink shared channel (PUSCH) occasion having a resource allocation that is based at least in part on the metric.

29. The network node of claim 28, wherein the one or more processors are further configured to execute the instructions to cause the network node to:

receive, via the at least one transceiver, a msgA payload in the PUSCH occasion.

30. The network node of claim 16, wherein the network node is a non-terrestrial network node.

31. A method of wireless communication performed by a user equipment (UE), comprising:

receiving, from a network node, signaling that indicates a first random access channel (RACH) occasion (RO) partition and a second RO partition, wherein the first RO partition is associated with first uplink transmission capabilities that are different from second uplink transmission capabilities that are associated with the second RO partition;

selecting an RO in the first RO partition or the second RO partition based at least in part on a metric that relates to an uplink transmission capability of the first uplink transmission capabilities; and transmitting a preamble in the selected RO.

* * * * *